(12) United States Patent
Strauss (10) Patent No.: US 11,801,571 B2
(45) Date of Patent: Oct. 31, 2023

(54) LASER PROCESSING DEVICE FOR PROCESSING SHIELDED CONDUCTORS AND METHOD FOR OPERATING A LASER PROCESSING DEVICE FOR PROCESSING SHIELDED CONDUCTORS

(71) Applicant: MD ELEKTRONIK GmbH, Waldkraiburg (DE)

(72) Inventor: Benedikt Strauss, Wasserburg (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 463 days.

(21) Appl. No.: 16/944,187

(22) Filed: Jul. 31, 2020

(65) Prior Publication Data
US 2021/0046583 A1    Feb. 18, 2021

(30) Foreign Application Priority Data
Aug. 12, 2019    (DE) ...................... 10 2019 121 631.1

(51) Int. Cl.
*B23K 26/12* (2014.01)
*B23K 37/04* (2006.01)
(Continued)

(52) U.S. Cl.
CPC ............ *B23K 26/127* (2013.01); *B23K 26/38* (2013.01); *B23K 37/0435* (2013.01);
(Continued)

(58) Field of Classification Search
CPC .. B23K 2101/38; B23K 26/38; B23K 26/103; B23K 26/127; B23K 2101/32;
(Continued)

(56) References Cited

U.S. PATENT DOCUMENTS 4,626,013 A * 12/1986 Barrows .............. B25J 17/0258
901/14
9,876,338 B2    1/2018 Reversat et al.
(Continued)

FOREIGN PATENT DOCUMENTS

DE    102008024136 A1    11/2009
DE    102018128922 A1    5/2020
(Continued)

*Primary Examiner* — Chris Q Liu
(74) *Attorney, Agent, or Firm* — LEYDIG, VOIT & MAYER, LTD.

(57) ABSTRACT

A laser processing device for processing shielded conductors includes a processing chamber configured to process an end portion of a shielded conductor disposed therein using laser radiation. The processing chamber has a housing defining an opening. In a processing position of the laser processing device, the end portion of the shielded conductor is inserted along an insertion axis into the opening and extends into the processing chamber. A gripping device is configured to fix the shielded conductor in the opening in the processing position of the laser processing device. In the processing position of the laser processing device, the gripping device is positioned at the housing without contact therebetween. The gripping device includes a first projection portion which extends at least partially into the opening along the insertion axis in the processing position of the laser processing device.

16 Claims, 11 Drawing Sheets

(51) Int. Cl.
  *B23K 101/38*    (2006.01)
  *B23K 26/38*     (2014.01)
  *H01B 13/00*     (2006.01)
  *H01B 13/22*     (2006.01)

(52) U.S. Cl.
  CPC ......... *H01B 13/003* (2013.01); *H01B 13/228* (2013.01); *B23K 2101/38* (2018.08)

(58) Field of Classification Search
  CPC ............ B23K 2101/34; B23K 2103/10; B23K 2103/12; B23K 26/0624; B23K 26/0643; B23K 26/0734; B23K 26/082; B23K 26/14; B23K 26/1464; B23K 26/28; B23K 26/40; B23K 26/0821; B23K 26/10; B23K 37/0435; B23K 26/0619; B23K 26/067

USPC ............ 219/121.73, 121.68, 121.69, 121.74, 219/121.79, 121.8, 121.85
  See application file for complete search history.

(56) References Cited

U.S. PATENT DOCUMENTS

| | | | |
|---|---|---|---|
| 2011/0100066 A1* | 5/2011 | Bohme | B23K 26/0734 65/501 |
| 2015/0162729 A1* | 6/2015 | Reversat | H02G 1/128 219/121.73 |
| 2017/0152968 A1* | 6/2017 | Raj | C23C 16/4404 |

FOREIGN PATENT DOCUMENTS

| | | |
|---|---|---|
| EP | 3404786 A1 | 11/2018 |
| WO | WO 2008084216 A1 | 7/2008 |

\* cited by examiner

LASER PROCESSING DEVICE FOR PROCESSING SHIELDED CONDUCTORS AND METHOD FOR OPERATING A LASER PROCESSING DEVICE FOR PROCESSING SHIELDED CONDUCTORS

CROSS-REFERENCE TO PRIOR APPLICATIONS

Priority is claimed to German Patent Application No. DE 10 2019 121 631.1, filed on Aug. 12, 2019, the entire disclosure of which is hereby incorporated by reference herein.

FIELD

The invention relates to embodiments of a laser processing device for processing shielded conductors, as well as embodiments of a method for operating such a laser processing device.

BACKGROUND

It is known to process shielded conductors, such as electrical cables, using laser radiation to, for example, circumferentially cut into a jacket of the cable, or to cut a shielding braid of the shielded conductor to length in an automated fashion. In such process, an end portion of the shielded conductor to be processed is inserted through an opening into a processing chamber of a laser processing device, such as a laser cutting device. Laser processing is then performed in the processing chamber. For safety reasons, it is important to protect the operator's environment from the lasering process; i.e., to prevent laser radiation hazardous to humans from leaking from the processing chamber into the operator's environment.

To this end, typically a protective hood rated for the respective laser class is placed over the laser processing device during processing; i.e., the laser processing device is accommodated within and surrounded on all sides by the protective hood. The protective hood must be sufficiently voluminous to accommodate the enclosed mechanism, which may include, in particular, a gripping device for centering the shielded conductor in the processing chamber. This requires a comparatively space-consuming design, and therefore, a relatively large amount of space is needed for such an approach. In addition, disadvantages arise with respect to the dynamics, and thus the cycle time of the (repeatedly performed) lasering process.

Figure 6:
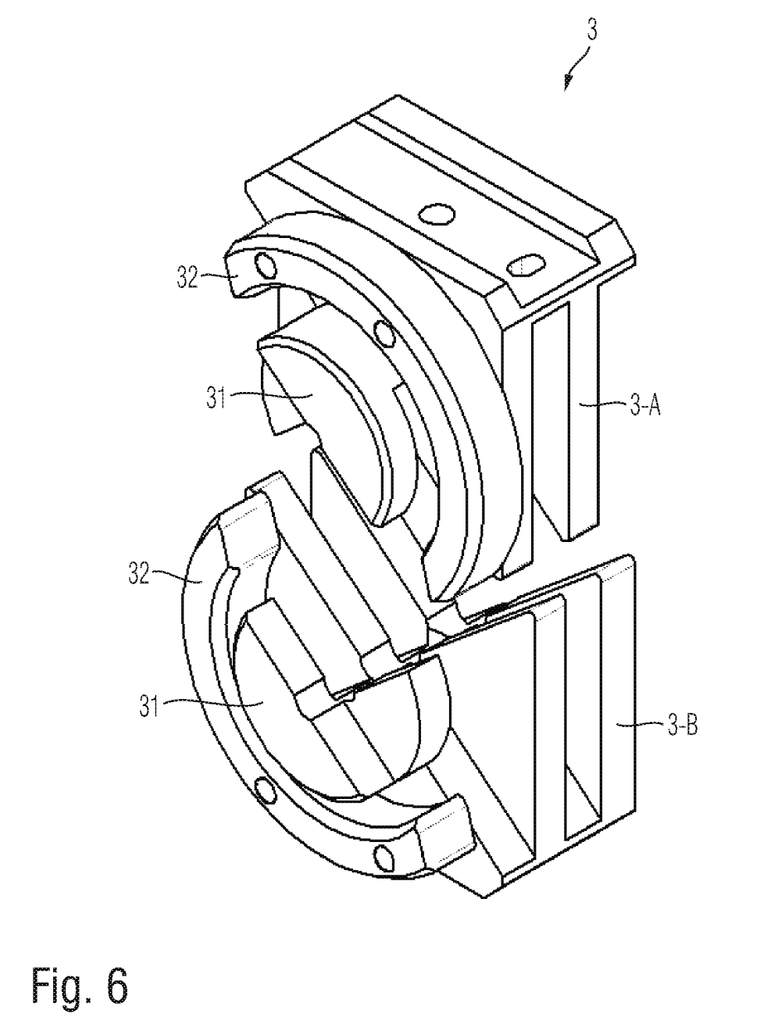
FIGS. 6-10 are different exemplary schematic perspective views of a gripping device of a laser processing device according to one or more embodiments.

EP 3 404 786 A1 describes with reference to FIG. 6 thereof a laser cutting device having a protective housing. The protective housing includes an opening which is closed by a mounting housing. The mounting housing includes a housing opening via which a cable end inserted through a cable insertion opening of the laser processing device is accessible to the laser that processes the cable end. The cable insertion opening is formed as a passage within which the cable jacket is spaced a small distance from the inner wall of the passage, so that the cable must be positioned very precisely relative to the passage. A sealing device may be placed between the protective housing and the mounting housing, preventing gases or particles from escaping through the opening of the protective housing.

U.S. Pat. No. 9,876,338 B2 describes a device for stripping an electrical cable. The device includes a gripper for the cable, the gripper being disposed in front of the opening of a processing chamber of a laser cutting process. An elastic sleeve surrounding the cable seals an entry opening of the processing chamber, so that the cable and the elastic sleeve together prevent escape of laser radiation from the device.

SUMMARY

In an embodiment, the present invention provides a laser processing device for processing shielded conductors. The laser processing device includes a processing chamber configured to process an end portion of a shielded conductor disposed therein using laser radiation. The processing chamber has a housing defining an opening. In a processing position of the laser processing device, the end portion of the shielded conductor is inserted along an insertion axis into the opening and extends into the processing chamber. A gripping device is configured to fix the shielded conductor in the opening in the processing position of the laser processing device. In the processing position of the laser processing device, the gripping device is positioned at the housing without contact therebetween. The gripping device includes a first projection portion which extends at least partially into the opening along the insertion axis in the processing position of the laser processing device.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

The previously known approaches for safety shielding of a laser processing device have the disadvantage of making it difficult to repeatedly perform the lasering process at a high cycle rate because the speed with which the conductor can be inserted into the processing chamber is limited by the respective mechanical sealing mechanisms of the processing chamber.

Embodiments of the present invention provide a laser processing device for processing a shielded conductor that reliably prevents escape of hazardous laser radiation and at the same time enables dynamic, repeated execution of the lasering process.

In accordance with an embodiment of the present invention, a laser processing device for processing shielded conductors includes: a processing chamber for processing a therein disposed end portion of a shielded conductor using laser radiation, a housing of the processing chamber defining an opening for insertion of the end portion along an insertion axis, as well as a gripping device for fixing the shielded conductor in the opening in a processing position of the laser processing device. In the processing position, the end portion extends into the processing chamber, and the gripping device is positioned at the housing without contact therebetween. The gripping device includes a first projection portion which extends at least partially into the opening along the insertion axis when the laser processing device is in the processing position.

An embodiment of the present invention is based on the discovery that in a laser processing device for processing shielded conductors, a gripping device can perform the function of fixing and positioning a conductor portion to be processed in an opening of the process chamber and at the same time the function of sealing the processing chamber to prevent escape of scattered laser radiation. Thus, the gripping device can perform both a process function, which may in particular include centering of the conductor end in the processing chamber, and a protective function (protection of the operator's environment from laser radiation). The combination of these two functions into one component allows savings of space, material and thus cost as compared to approaches where a separate system is provided for each of these functions. This makes it possible, in particular, to eliminate the mechanical complexity for a large enclosure with a protective hood.

In addition, the solution proposed herein may allow a shorter cycle time for a repeatedly performed lasering process. This is because in conventional approaches, where two different systems are needed for the above-described process and protective functions, these systems cannot always be driven in parallel for mechanical reasons, which leads to longer cycle times.

In the solution according to an embodiment of the invention, the fact that the gripping device is positioned at the housing without contact therebetween in the processing position also contributes to a potentially shorter cycle time of the lasering process. Accordingly, the laser processing device is operated without abutting engagement; i.e., the gripping device and the housing of the processing chamber do not come into direct contact with each other during the establishment of the processing position, during which relative movement occurs between the processing chamber and the gripping device holding the end portion of the shielded conductor. Thus, the relative movement, during which the gripping device and the housing approach each other, can be performed dynamically and potentially overall faster than in solutions where contact occurs between the gripping device and processing chamber housing (which requires highly accurate position control during the approach movement in order to prevent damaging collisions).

Since, in accordance with an embodiment of the invention, the gripping device includes a first projection portion which, for example, protrudes (relative to other portions of the gripping device) along the insertion axis toward the opening and extends at least partially into the opening along the insertion axis when the laser processing device is in the processing position, escape of harmful laser radiation can be reliably prevented even when the gripping device is positioned at the housing of the processing chamber without contact therebetween. In particular, a radial sealing gap remaining between the first projection portion and the housing may form a clearance seal, the clearance seal forming a part of a "labyrinth seal" in which the laser radiation peters out, so that, if at all, a greatly reduced and thus harmless laser intensity may leak to the outside. For example, it may be provided that the path of the sealing gap change its direction at least once, preferably several times, by at least 90°. This will be explained below in more detail with reference to exemplary embodiments.

Several specific embodiments are described hereinafter.

The laser processing device may in particular be a laser cutting device. For example, the laser cutting device may be designed for cutting to length a shielding braid in the region of the end portion of the shielded conductor. For this purpose, the laser processing device may include a laser device, such as a fiber laser, to provide (produce) suitable laser radiation. The laser radiation may, for example, selectively act on metal and thus may be targeted to cut (only) metallic portions of the shielded conductor. A laser beam provided by the laser processing device is deflected by deflection mirrors within the processing chamber in such a way that the deflected laser beam moves around the (possibly stripped) cable end portion to be processed on a circular path about the cable axis and thus makes an incision that is concentric with the cable axis. This applies in the case where the laser beam is provided for cutting the jacket surrounding the cable as well as in the case where the laser beam is provided for cutting a metal braided shield, the braided shield being accessible after removal of the cable jacket.

The gripping device may include, for example, two or more sections that can be placed against each other to assume a gripping position in which the gripping device grips the shielded conductor. The sections of the gripping device will hereinafter also be referred to as (gripper) jaws. For example, in the gripping position of the gripping device, the shielded conductor can be clamped by the engaged jaws in a passage formed, for example, by suitable recesses in the jaws. Thus, the gripping device can perform both a positioning/centering function and—together with the shielded conductor—also a sealing function (with respect to the laser radiation).

In particular, the gripping device may be configured to prevent laser radiation from escaping from the laser processing device when the laser processing device is in the processing position. The design of the gripping device with respect to opening of the processing chamber housing can make it possible, in particular, to prevent escape of laser radiation, be it directional (reflected) beam-type laser radiation or stray laser radiation, from the processing chamber, and thus to easily comply with the safety regulations for the operation of the processing chamber.

A preferred embodiment provides that, in the processing position, the gripping device completely cover the opening in a direction along the insertion axis. In the processing position, the gripping device may, for example, completely overlap both the opening and an edge region of the housing surrounding the opening. This prevents direct escape of laser radiation from the processing chamber. It should be noted that the shielded conductor held by the gripping device may itself contribute to completely cover the opening. For example, in the gripping position of the gripping device, the shielded conductor is clamped by at least two jaws of the gripping device in a central position within a passage. Thus, when in this position, the shielded conductor may itself contribute to the sealing of the laser processing device against leakage of laser radiation in the processing position. The above phrase, according to which, in the processing position, the gripping device completely covers the opening in a direction along the insertion axis, is intended to include such an arrangement as well.

In a suitable embodiment of the inventive laser processing device, a sealing gap remaining between the housing and the gripping device in the processing position forms a labyrinth seal for the laser radiation. This means that, if at all, the laser radiation could leak out from the laser processing device through the sealing gap only on a scattering path along which it peters out due to repeated reflection or scattering.

In an advantageous embodiment, the basic shape of the first projection portion is radially symmetric, for example circular disk-shaped, with respect to the insertion axis when considered in the processing position of the laser processing device. For example, the first projection portion may be configured in the form of one or more circular disks (arranged one behind the other) which protrude from other portions of the gripping device along the insertion axis toward the processing chamber. The first projection portion may be composed of several parts, such as two semi-circular disks, each of which belongs to, for example, a gripper jaw of the gripping device.

An embodiment of the present invention provides that the gripping device includes a second projection portion surrounding the first projection portion. In particular, in the processing position, the second projection portion may surround the first projection portion radially with respect to the insertion axis. In such configuration, the second projection portion, just as the first projection portion, protrudes from other portions of the gripping device in the axial direction toward the processing chamber.

The basic shape of the second projection portion is preferably also radially symmetric with respect to the insertion axis in the processing position of the laser processing device. For example, the second projection portion may be configured in the form of an annular ring. The second projection portion may be composed of several parts, such as two half-rings, each of which belongs to a gripper jaw of the gripping device.

In this refinement, it is also expedient if the housing has a receiving groove which surrounds the opening and which, in the processing position, receives at least a portion of the gripping device without it contacting the surfaces of the receiving groove. In this case, it may be provided, in particular, that in the processing position, the second projection portion be at least partially received in the receiving groove without any contact occurring between a surface portion of the second projection portion and the surface of the receiving groove. In particular, a sealing gap remaining between the second projection portion and a groove base of the receiving groove and/or a radial sealing gap between the second projection portion and at least one side wall of the groove may form a part of a labyrinth seal for the laser radiation and thus contribute to the protective sealing function of the gripping device.

In accordance with another embodiment, the present invention provides a method for operating a laser processing device according to an embodiment of the invention. In this method, the laser processing device is brought into the processing position by positioning the gripping device at the housing without contact therebetween. In this position, in particular, at least one sealing gap may remain throughout between the gripping device and the housing.

What is said in the description above and below with respect to embodiments of the laser processing device in accordance applies analogously to embodiments of the method, and vice versa.

Figure 1:
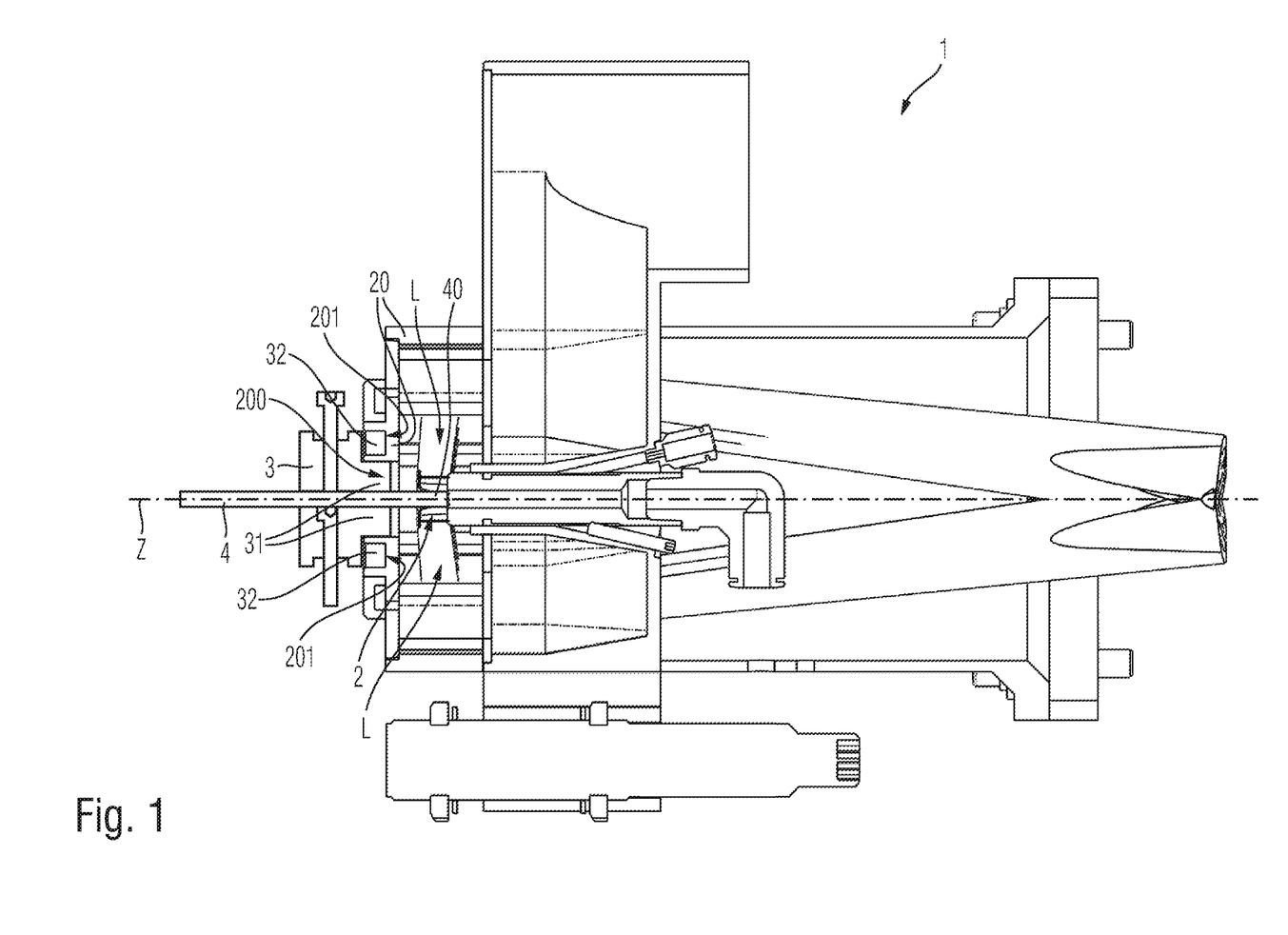
FIG. 1 is an exemplary schematic cross-sectional view of a portion of a laser processing device according to one or more embodiments.
Figure 4:
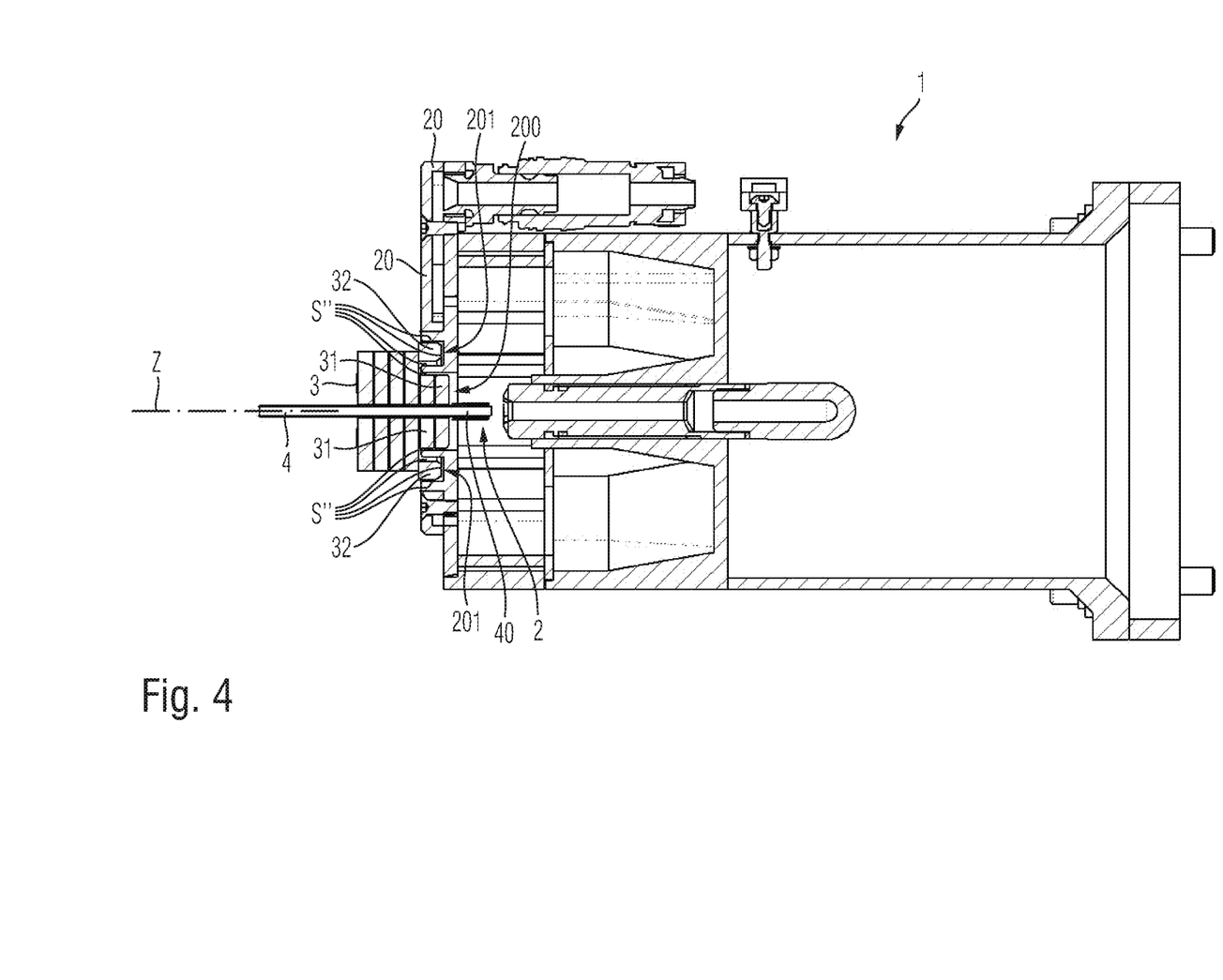
FIG. 4 is an exemplary schematic cross-sectional view of a portion of a laser processing device according to one or more embodiments.

FIG. 1 and FIG. 4 exemplarily and schematically show, in cross section, a portion of a laser processing device 1 according to one or more embodiments.

Laser processing device 1 is, for example, a laser cutting device for automated cutting to length of a shielding braid of shielded conductor 4. Thus, shielded conductor 4 may be a conductor having a shielding braid.

Specifically, FIG. 1 shows what is referred to as a laser head of a laser processing device 1. The laser head includes, in particular, a processing chamber 2 for processing a therein disposed end portion 40 of shielded conductor 4 using a laser radiation L. Laser processing device 1 may further have a laser device for producing laser radiation L. Such a laser device may be located, for example, to the right of the illustrated portion; i.e., of the laser head, as viewed in FIG. 1. The laser device may include, for example, a fiber laser whose laser radiation is introduced into the laser head and deflected by suitable optics into processing chamber 2. Possible embodiments of such laser devices and associated optics are per se known to those skilled in the art and, therefore, are not described here in more detail.

Processing chamber 2, which is disposed in the front portion of the laser head, includes a housing 20 having an opening 200 for insertion of the end portion 40 of shielded conductor 4 that is to be processed. The insertion of end portion 40 into processing chamber 2 is accomplished by a relative movement between processing chamber 2 (i.e., the laser head) on the one hand, and, on the other hand, a gripping device 3 gripping shielded conductor 4.

For this purpose, for example, the laser head may be moved along an insertion axis Z toward gripping device 3 of shielded conductor 4 (and/or vice versa) until laser processing device 1 reaches a processing position in which end portion 40 of shielded conductor 4 extends into processing chamber 2 in a desired orientation and position. This processing position is illustrated in FIG. 1. As shown, gripping device 3 fixes shielded conductor 4 in opening 200 and at the same time centers end portion 40 in processing chamber 2 in a suitable, defined processing position.

For this purpose, gripping device 3 includes, for example, two (or more) separate sections in the form of gripper jaws 3-A, 3-B, which can be pneumatically moved into a gripping position in which they clamp the shielded conductor therebetween. Further details regarding gripping device 3 are described in more detail further below with reference to the following figures. Gripping device 3 is supported by a supporting device. The supporting device may include a carriage assembly that is movable in a direction along the insertion axis Z, so that gripping device 3 can move end portion 40 into and out of the processing position in processing chamber 2 with the aid of the carriage assembly.

In addition to the above-described fixing and centering function performed by gripping device 3 with respect to shielded conductor 4, gripping device 3 performs a safety function in that it covers processing chamber 2 so as to prevent escape of hazardous laser radiation from laser processing device 1. It can be seen, for example, in FIG. 1 that in the illustrated processing position, gripping device 3 completely covers opening 200 in a direction along insertion axis Z, the covering being partially accomplished (at the center) by shielded conductor 4 itself. The shielded conductor 4 to be processed extends at a central position through a passage 33 in gripping device 3 and is tightly clamped in this area between gripper jaws 3-A, 3-B of gripping device 3. In this connection, in particular, a rear portion of gripping device 3 overlaps a portion of housing 20 surrounding opening 200 and thereby ensures complete covering in the direction of insertion axis Z.

Gripping device 3 further includes a first projection portion 31 that protrudes from the rear portion axially (i.e., along insertion axis Z) toward processing chamber 2. In the illustrated processing position, first projection portion 31 extends into opening 200, substantially filling it. However, gripping device 3 is positioned at housing 20 without contact therebetween, so that a continuous sealing gap S (see, for example, FIG. 5) remains between gripping device 3 and housing 20 in the region of opening 200. Sealing gap S is configured as an annular gap formed between the radially outer surface of first projection portion 31 and the radially opposite inner surface of opening 200. The thickness of sealing gap S is significantly less than the extent of first projection portion 31 within opening 200. In particular, the thickness of sealing gap S; i.e., the distance between the radially outer surface of first projection portion 31 and the radially opposite inner surface of opening 200, is selected to be as small as permitted by the manufacturing tolerance of opening 200 and the outside diameter of first projection section 31 as well as the reproducibility of the dynamic insertion and retraction movement of first projection portion 31 into and out of opening 200. The thickness of sealing gap S is less than about 5%, in particular about 3% of the diameter of opening 200. First projection portion 31 penetrates opening 200 by a distance more than 10 times the thickness of sealing gap S. Sealing gap S is a (first) section of a labyrinth seal which will be described in more detail below and whose function is to seal the interior of processing chamber 2 in a radiation tight manner against escape of laser radiation to the outside.

With reference to the other figures, a more detailed description will now be given on how the sealing of laser processing device 1 is specifically accomplished with the aid of first projection portion 31 of gripping device 3 and sealing gap S between the gripping device and housing 20, and about which optional further structural features of gripping device 3 and/or housing 20 may assist the protective function.

Figure 2:
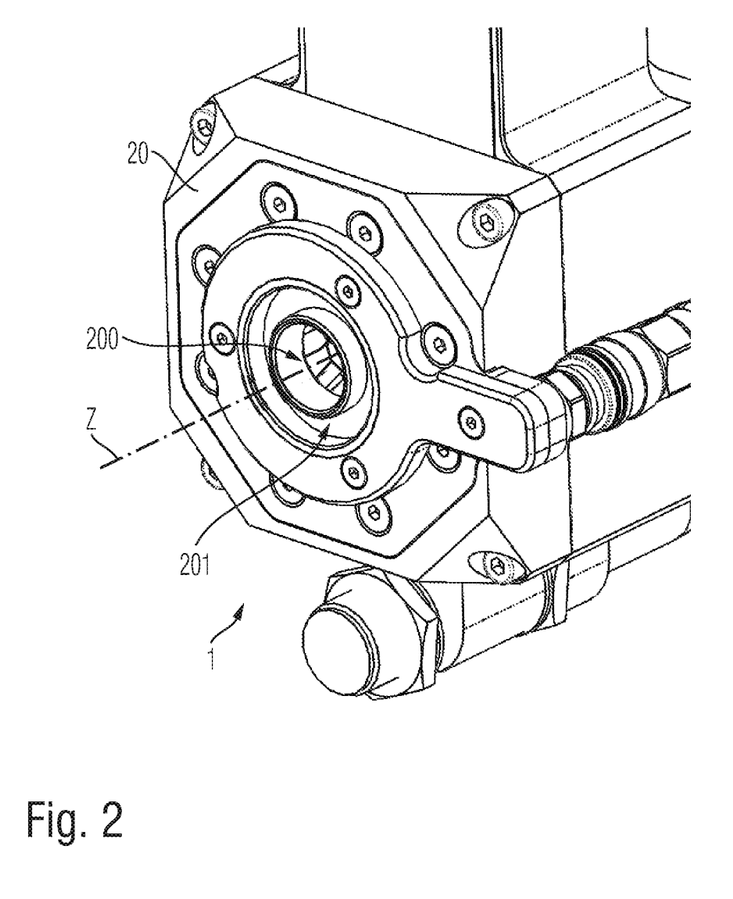
FIG. 2 is an exemplary schematic perspective view of a portion of a laser processing device according to one or more embodiments.

FIG. 2 shows the protective laser head of FIG. 1 in an exemplary schematic perspective view looking obliquely from above at the front end thereof. Gripping device 3 is not shown in FIG. 2; i.e., no shielded conductor 4 is inserted in processing chamber 2. Accordingly, laser processing device 1 is not in the processing position. Rather, processing chamber 2 is shown in an open condition. Opening 200 of housing 20, which is oriented along insertion axis Z, is clearly visible in this view.

In this exemplary embodiment, opening 200 has a circular peripheral contour. Housing 20 has formed therein an annular receiving groove 201 around opening 200. Receiving groove 201 serves to receive a portion of gripping device 3 in the processing position, namely preferably an annular ring-shaped second projection portion 32 of gripping device 3. This will be explained below in more detail with reference to FIG. 5.

Figure 3:
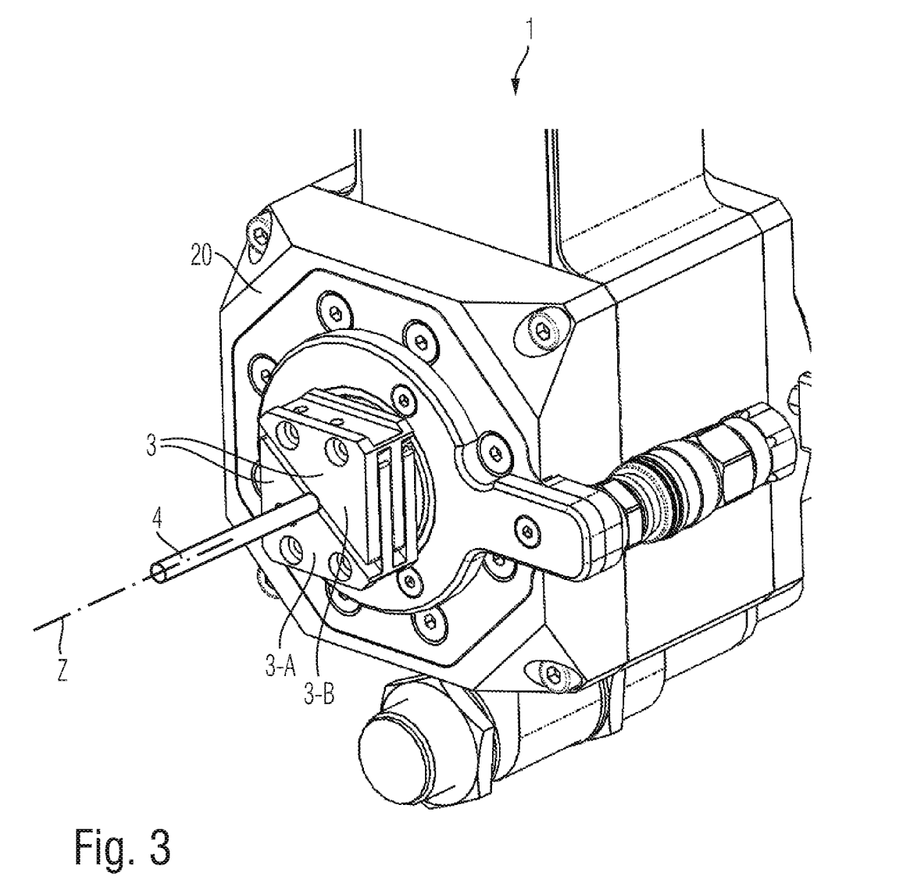
FIG. 3 is an exemplary schematic perspective view of a portion of a laser processing device according to one or more embodiments.

In FIG. 3, the laser head of FIG. 2 is shown in a position that corresponds to the processing position of laser processing device 1. In this condition, gripping device 3, together with the shielded conductor 4 fixed therein, is positioned at housing 20 in the region of opening 200 without contact therebetween, so that end portion 40 of shielded conductor 4 extends along insertion axis Z into processing chamber 2.

Gripping device 3 includes two separate sections in the form of gripper jaws 3-A, 3-B. When gripping device 3 is in the illustrated gripping position, gripper jaws 3-A, 3-B are forced against each other (for example, under the action of a pneumatic system) such that they clamp shielded conductor 4 therebetween. Thus, in the processing position, gripping device 3 fixes and centers shielded conductor 4 in opening 200 such that the end portion 40 to be processed is located within processing chamber 2 exactly at a position that is suitable for the laser processing process.

FIG. 4 is another cross-sectional view showing a laser processing device 1 according to one or more embodiments in the processing position. The basic design corresponds to that shown in the cross-sectional view of FIG. 1. In this regard, reference is made to the description above.

Figure 5:
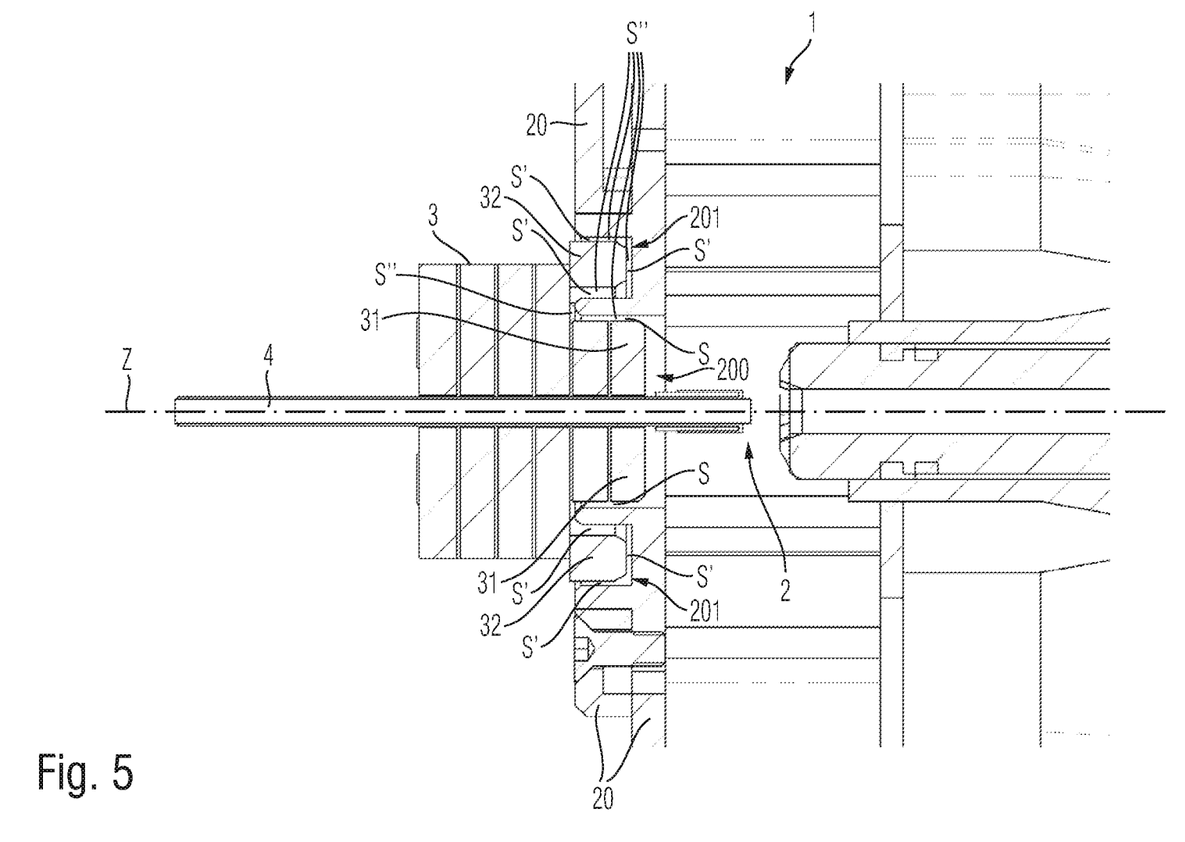
FIG. 5 is an enlarged detail of the cross-sectional view of FIG. 4.

FIG. 5 shows an enlarged detail of the cross-sectional view of FIG. 4, including, in particular, the region of opening 200 of housing 20 and the gripping device 3 positioned there. In the enlarged cross-sectional view, it is clearly seen that, in the illustrated processing position, first projection portion 31 of gripping device 3 extends into opening 200, leaving a radial sealing gap S between housing 20 and first projection portion 31.

The cross-sectional view of FIG. 5 further shows the ring-shaped second projection element 32, which surrounds first projection element 31 radially with respect to insertion axis Z. Second projection element 32 extends into annular receiving groove 201, which surrounds opening 200, leaving another, second sealing gap S' between second projection element 32 and housing 20. A section of second sealing gap S' between second projection element 32 and housing 20 extends along a groove base of receiving groove 201. Further sections of second sealing gap S' extend along an inner side wall and an outer side wall of receiving groove 201, respectively. As can be seen in FIG. 5, second sealing gap S' has a short first section extending radially; i.e., away from insertion axis Z, and further a second section defined between a lateral surface of second projection element 32 and a lateral surface of receiving groove 201, followed by third, radially oriented section defined between the front face of second projection element 32 and the bottom surface of the receiving groove 201, as well as a fourth section which is oriented parallel to insertion axis Z and defined between the other lateral surface of second projection element 32 and the other lateral surface of receiving groove 201 and which opens into the ambient surroundings of housing 20. The first section of second sealing gap S' joins first sealing gap S, forming an angle of about 90° therewith. Each two adjoining sections of second sealing gap S' form an angle of about 90° therebetween, so that in the processing position of gripping device 3, second sealing gap S' acts as labyrinth seal.

Altogether, an overall sealing gap S", whose two sections, namely the first sealing gap S extending substantially parallel to insertion axis Z and second sealing gap S' are shown in FIG. 5, extends continuously from inside to outside between gripping device 3 and housing 20. A path of overall sealing gap S" undergoes multiple, distinct changes in direction on its way from the inside to the outside (i.e., from the interior of processing chamber 2 to the ambient region outside of laser processing device 1) and, in particular, includes several changes in direction by 90°. For example, the path of the radial gap between the first projection portion 31 and the housing has an axial direction (i.e., a direction parallel to insertion axis Z), and the path of the axial gap between the second projection portion 32 and the groove base of receiving groove 201 has a radial direction (i.e., a direction perpendicular to insertion axis Z). Thus, as a result, second sealing gap S' forms a labyrinth seal within which the scattered laser radiation from processing chamber 2 is effectively dissipated.

In the processing position, overall sealing gap S" between gripping device 3 and housing 20 is maintained, thus preventing gripping device 3 from being moved into abutting engagement during the establishment of the processing position of laser processing device 1 (i.e., from coming into a contact position where a portion of gripping device 3 would contact housing 20). Rather, laser processing device 1 is brought into the processing position by positioning gripping device 3 at housing 20 without contact therebetween. Thus, the invention also encompasses a method for operating the described laser processing device 1, wherein laser processing device 1 is brought into the processing position by positioning gripping device 3 at housing 20 without contact therebetween. This has the advantage that laser processing device 1 can be operated dynamically, which allows for a faster cycle time.

Figure 9:
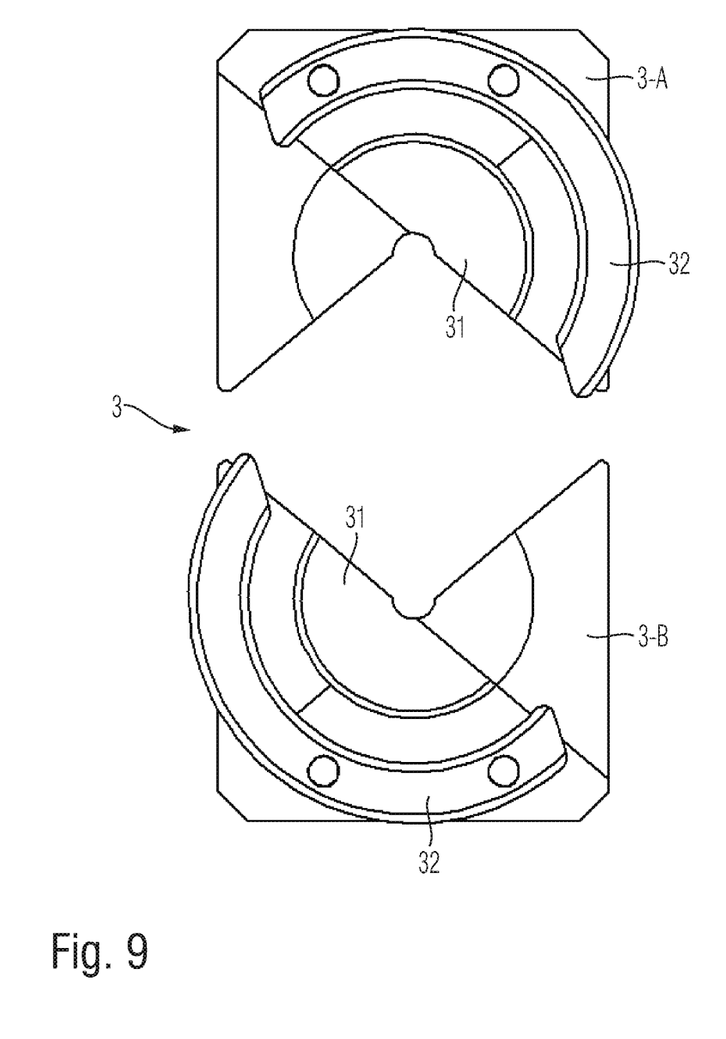
Figure 10:
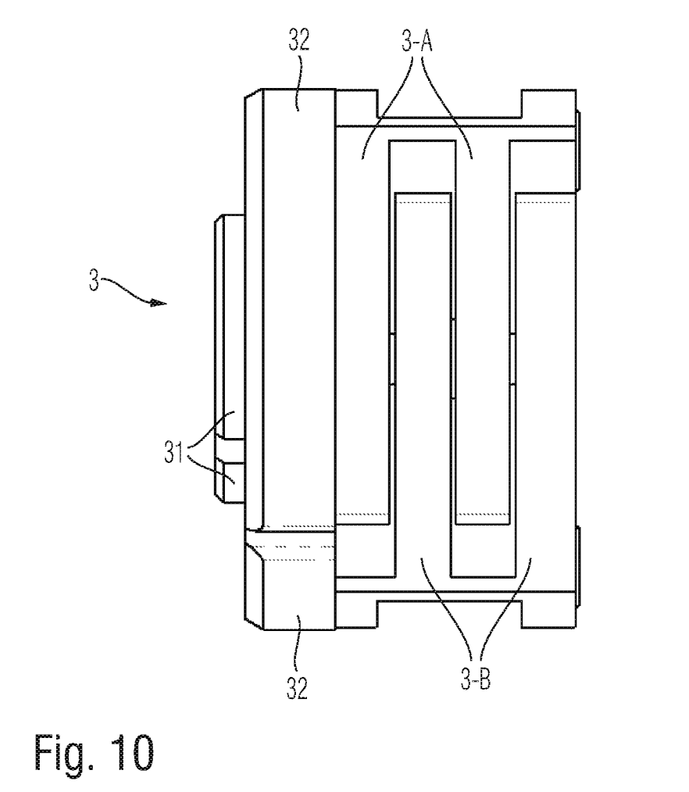
Figure 11:
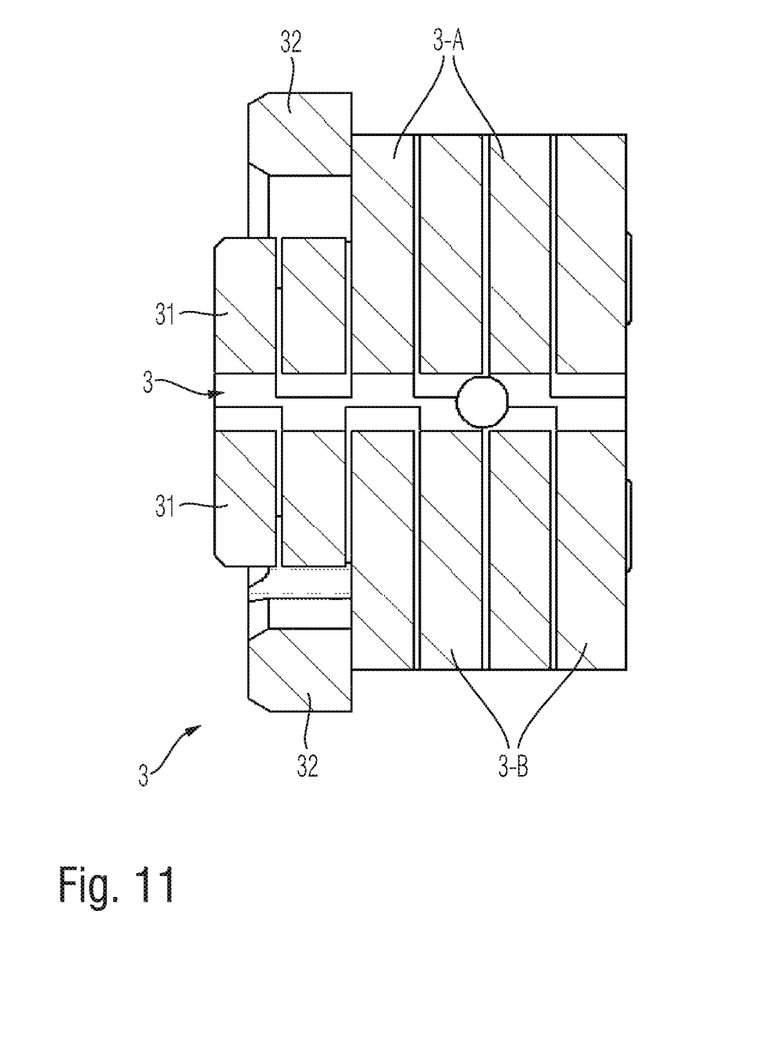
FIG. 11 is an exemplary schematic cross-sectional view of a gripping device of a laser processing device according to one or more embodiments.

FIGS. 6-10 show different perspective views of a gripping device 3 of a laser processing device 1 according to one or more embodiments. FIG. 11 shows an axial cross-sectional view of such a gripping device 3. The gripping devices 3 shown in FIGS. 1 and 3-5, respectively, may, for example, be gripping devices 3 of the type illustrated in FIGS. 6 through 11 and described in more detail below. In the following, reference is generally made to all of FIGS. 6 through 11 collectively. In some instances, special reference is made to some of the figures.

In FIG. 6, a gripping device 3 is shown in an open position. This view clearly shows that gripping device 3 includes two separate sections 3-A, 3-B in the form of gripper jaws. Gripper jaws 3-A, 3-B may include, for example, a metallic material, and in particular, may be made of a metal.

Figure 7:
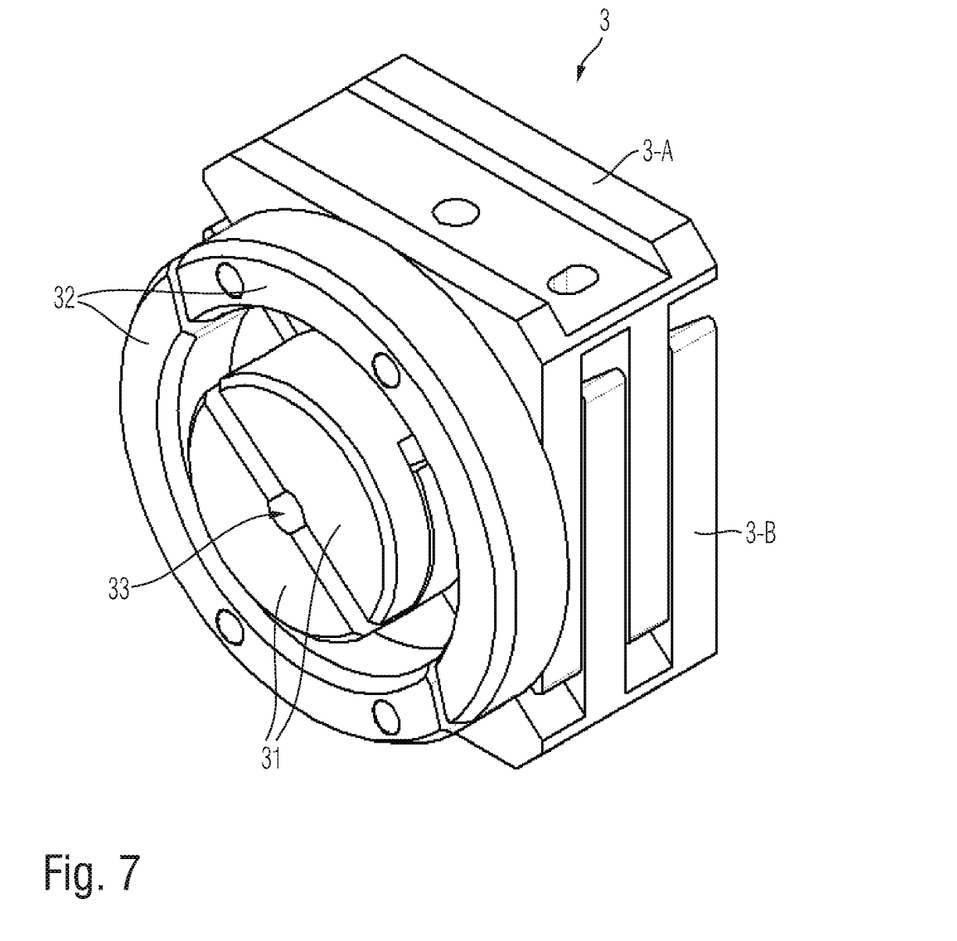

FIG. 7 illustrates the gripping position of the gripping device 3 of FIG. 6. In order for gripper jaws 3-A, 3-B to assume the gripping position, they are placed against each other. Gripping device 3 has a central passage 33 for shielded conductor 4, into which passage shielded conductor 4 can be inserted when gripping device 3 is in the open position. To establish the gripping position of gripping device 3, gripper jaws 3-A, 3-B may be moved toward each other, for example, by means of a pneumatic system, such that shielded conductor 4 is firmly clamped between gripper jaws 3-A, 3-B. A jacket of conductor 4 is then in contact with the surface of passage 33.

It may be provided that a position of the respective gripper jaws 3-A, 3-B be interrogated in an automated fashion for safety reasons, for example, in order to avoid collisions. To detect the positions of gripper jaws 3-A, 3-B, for example, one or more sensors, such as laser-based sensors or inductive sensors, may be disposed on gripping device 3.

Furthermore, the two gripper jaws 3-A, 3-B may, for example, be configured to allow for overtravel during the closure of gripping device 3 (i.e., as the gripping position is assumed) when no conductor 4 is present between gripper jaws 3-A, 3-B. This means that, as illustrated in FIG. 6, the different portions of the gripper jaws 3-A, 3-B can be brought into mesh with each other like interleaved plates and moved beyond a certain point that corresponds to the normal gripping position when shielded conductor 4 is inserted. The overtravel may optionally be measured by sensor means, so that an improper (incorrect) gripping position can be detected in an automated fashion.

Figure 8:
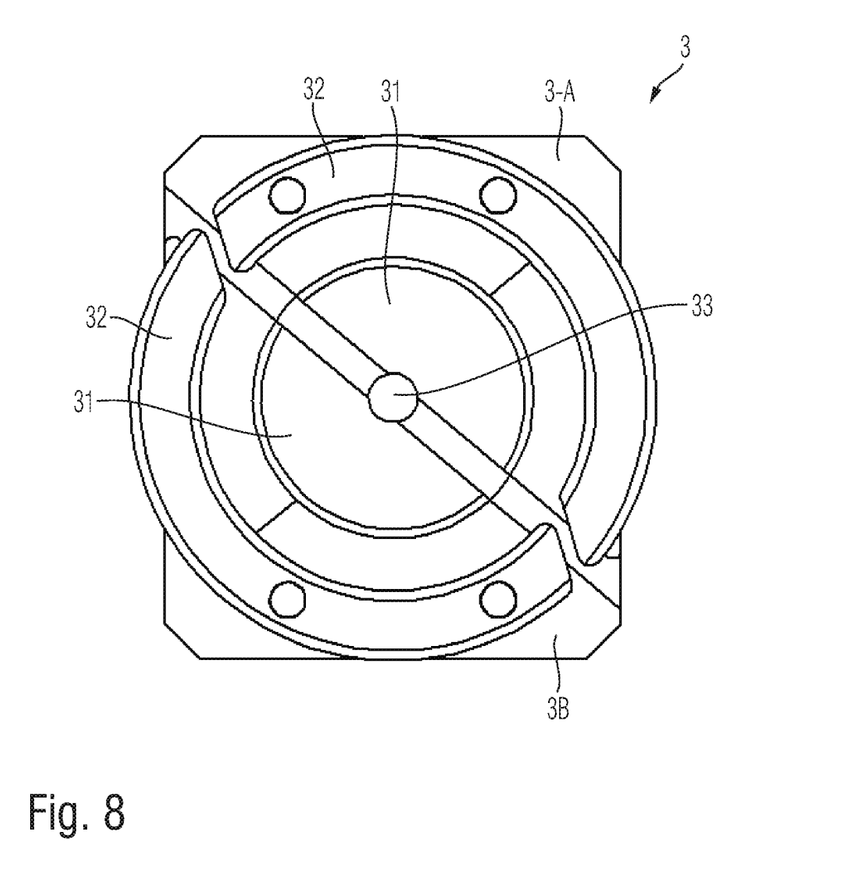

FIG. 8 shows the gripping position of FIG. 7 in a frontal view of gripping device 3. FIG. 9 shows the open position of FIG. 6 in a frontal view. FIG. 10 is a side view showing gripping device 3 in the gripping position. FIG. 11 illustrates a corresponding axial cross section in the gripping position.

It is clear, for example, from FIGS. 6 and 7, that in this exemplary embodiment, both the first projection portion 31 and the second projection portion 32 protrude axially from other portions of gripping device 3. The two projection sections 31, 32 are each radially symmetric in their basic shape.

In the gripping position of gripping device 3, first projection portion 31 has a circular-cylindrical or circular disk-shaped basic shape that is made up of two semi-circular disks, each belonging to a respective one of gripper jaws 3-A, 3-B. By configuring first projection portion 31 such that its peripheral contour has a circular-cylindrical or circular disk-shaped basic shape, it is ensured that the annular gap S formed with the inner surface of opening 200 has a substantially constant gap width in the circumferential direction about insertion axis Z.

When viewed in the gripping position, second projection portion 32 is configured in the form of an annular ring that completely radially surrounds first projection portion 31. In the embodiment shown, the second projection portion 32 is composed of two half-rings, each formed on a respective one of gripper jaws 3-A, 3-B. Second projection portion 32 is adapted in terms of its dimensions to receiving groove 201 of housing 20 (illustrated, for example, in FIG. 2), so that in the processing position, second projection portion 32 is received in receiving groove 201, forming second sealing gap S' but without coming into contact with receiving groove 201.

In the exemplary embodiment described above, second projection portion 32 is formed by a single annular ring that forms a single labyrinth seal in the region of second sealing gap S'. It is understood that second projection portion 32 may include two or more annular rings, each of which may form a second or additional labyrinth seal in the region of the substantially radially extending second sealing gap S'. In particular, by providing additional annular rings, the sealing effect against leakage of laser radiation can be further improved in a simple manner.

In the exemplary embodiment described above, it is provided that first projection portion 31 have a radially symmetric basic shape with respect to insertion axis Z. Generally, with regard to the cross-sectional contour of opening 200, the basic shape of first projection portion 31 is selected such that the sealing gap S formed between the periphery of first projection portion 31 and the inner surface of opening 200 (which is not necessarily an annular gap) has a substantially constant width in the circumferential direction about insertion axis Z. It may be provided, for example, that gripping device 3 be configured to hold two parallel cables 4 and, accordingly, that its peripheral contour be oval instead of circular as viewed along insertion axis Z. In this case, the inner surface of opening 200 is correspondingly oval in contour. In this case, it is provided that first projection portion 31 have an outer contour that this adapted to match the cross-sectional contour of the inner surface of opening 200 (i.e., also an oval outer contour), so that sealing gap S, which has a substantially oval path, can have a substantially constant width in the circumferential direction about insertion axis Z.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 laser processing device
2 processing chamber
20 housing
200 opening
201 receiving groove
3 gripping dev ice
31 first projection portion
32 second projection portion
33 passage
3-A first section
3-B second section
4 shielded conductor
40 end portion
L laser radiation
S (first) sealing gap
S' second seal gap
S" overall sealing gap
Z insertion axis

What is claimed is:

1. A laser processing device for processing shielded conductors, the laser processing device comprising:
  a processing chamber configured to process an end portion of a shielded conductor disposed therein using laser radiation, the processing chamber being surrounded by a housing defining an opening into the processing chamber, wherein, in a processing position of the laser processing device, the end portion of the shielded conductor is inserted along an insertion axis into the opening and extends into the processing chamber; and
  a gripping device configured to fix the shielded conductor in the opening in the processing position of the laser processing device, the gripping device being movable along the insertion axis relative to the housing;
  wherein, in the processing position of the laser processing device, the gripping device is positioned at the housing without contact therebetween, and
  wherein the gripping device includes a first projection portion which extends at least partially into the opening along the insertion axis in the processing position of the laser processing device.

2. The laser processing device as recited in claim 1, wherein the gripping device is configured to prevent laser radiation from escaping from the laser processing device in the processing position of the laser processing device.

3. The laser processing device as recited in claim 1, wherein, in the processing position of the laser processing device, the gripping device completely covers the opening in a direction along the insertion axis.

4. The laser processing device as recited in claim 1, wherein, in the processing position of the laser processing device, a sealing gap remaining between the housing and the gripping device forms a labyrinth seal for the laser radiation.

5. The laser processing device as recited in claim 1, wherein the first projection portion has a radially symmetric basic shape with respect to the insertion axis.

6. The laser processing device as recited in claim 1, wherein the gripping device has a second projection portion surrounding the first projection portion.

7. The laser processing device as recited in claim 1, wherein the housing has a receiving groove which surrounds the opening and which, in the processing position of the laser processing device, is configured to receive at least a portion of the gripping device.

8. The laser processing device as recited in claim 7, wherein the gripping device has a second projection portion surrounding the first projection portion, and wherein, in the processing position of the laser processing device, the second projection portion is at least partially received in the receiving groove.

9. The laser processing device as recited in claim 1, wherein the gripping device includes at least two sections that are configured to be placed against each other to assume a gripping position in which the gripping device grips the shielded conductor.

10. The laser processing device as recited in claim 1, wherein the gripping device comprises gripping jaws that are movable toward each other to a gripping position in which the shielded conductor is clamped between the gripping jaws.

11. The laser processing device as recited in claim 10, wherein, in the processing position of the laser processing device, the gripping jaws are at least partially positioned within the opening.

12. The laser processing device as recited in claim 10, wherein the gripping jaws are configured to mesh with each other as interleaved plates, and are movable beyond a gripping position with the shielded conductor inserted.

13. The laser processing device as recited in claim 1, wherein, in the processing position of the laser processing device, the first projecting portion forms a sealing gap between the first projecting portion and a surrounding wall of the opening.

14. The laser processing device as recited in claim 13, wherein the sealing gap has a thickness between the first projecting portion and the surrounding wall of the opening that is less than 5% of a diameter of the opening.

15. The laser processing device as recited in claim 13, wherein the gripping device has a second projection portion surrounding the first projection portion, and wherein, in the processing position of the laser processing device, the second projection portion forms a second sealing gap between the second projection portion and an outer wall of the housing, the second sealing gap being connected with the sealing gap.

16. A method for operating the laser processing device according to claim 1, the method comprising:
   bringing the laser processing device into the processing position by positioning the gripping device at the housing without contact therebetween.

* * * * *